R. KEMP.
STRUCTURAL ELEMENT.
APPLICATION FILED MAY 26, 1916.

1,435,244.

Patented Nov. 14, 1922.
3 SHEETS—SHEET 1.

WITNESSES:
Walter B. Payne
Nelson H. Copp

INVENTOR
Robert Kemp
BY
his ATTORNEYS

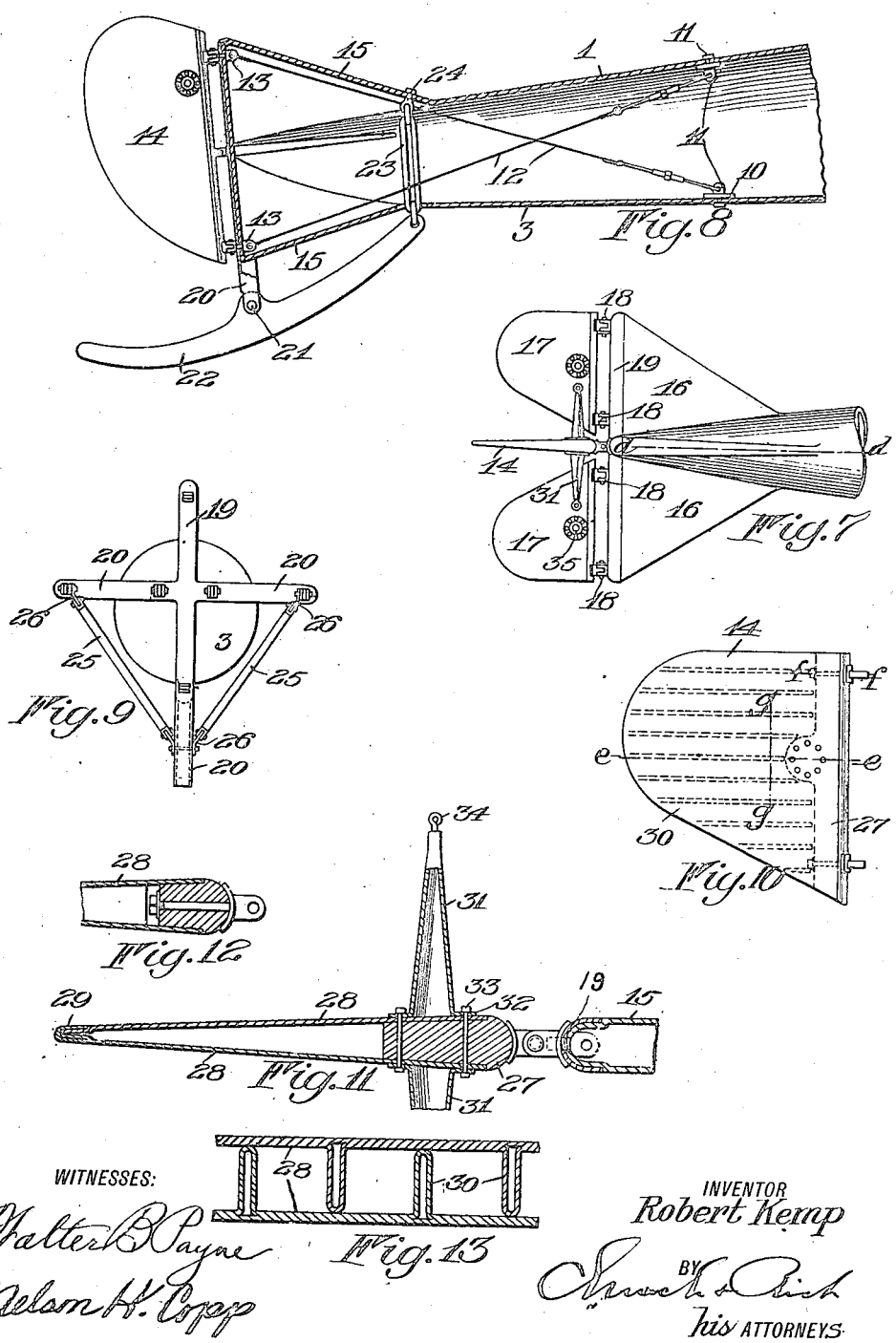

R. KEMP.
STRUCTURAL ELEMENT.
APPLICATION FILED MAY 26, 1916.
1,435,244.
Patented Nov. 14, 1922.
3 SHEETS—SHEET 3.
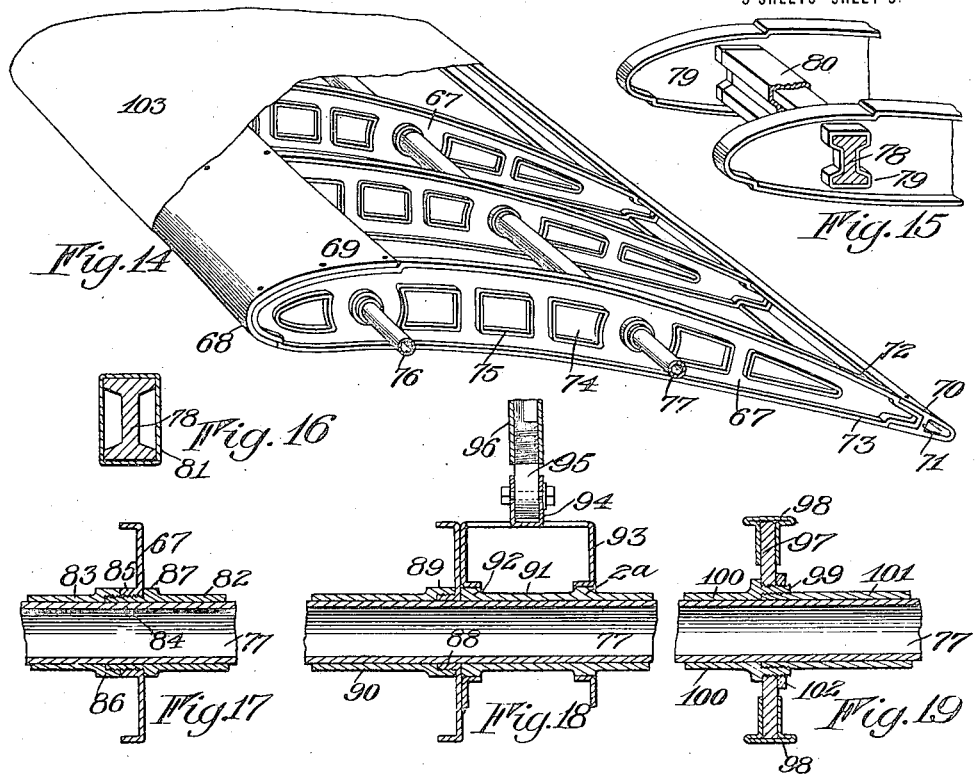
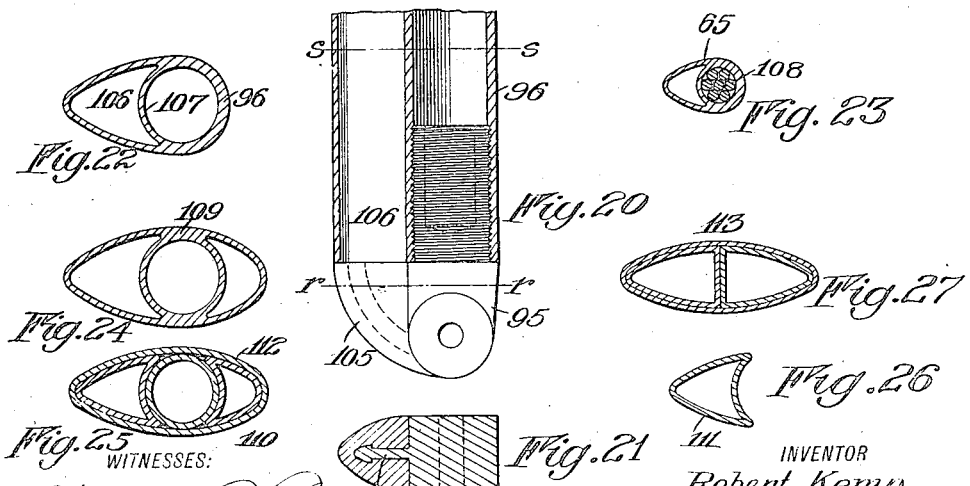
INVENTOR
Robert Kemp
BY
his ATTORNEYS Patented Nov. 14, 1922.

1,435,244

UNITED STATES PATENT OFFICE.

ROBERT KEMP, OF TROY, NEW YORK, ASSIGNOR TO WESTINGHOUSE ELECTRIC & MANUFACTURING COMPANY, A CORPORATION OF PENNSYLVANIA.

STRUCTURAL ELEMENT.

Application filed May 26, 1916. Serial No. 99,995.

*To all whom it may concern:*

Be it known that I, ROBERT KEMP, of Troy, in the county of Rensselaer and State of New York, have invented certain new and useful Improvements in Structural Elements; and I do hereby declare the following to be a full, clear, and exact description of the same, reference being had to the accompanying drawings, forming a part of this specification, and to the reference numerals marked thereon.

My invention relates to improvements in structural elements, and more particularly to elements used in aeroplane construction, and has for its object the formation of various structures, which are light, strong and durable, thereby adapted to flying machine construction. Another object of the invention is to simplify construction, as in aeroplane construction, as an instance, I am able not only to materially reduce the number of parts required, and thereby the cost, but provide at the same time, structural elements possible of cheap and rapid assembly by labor relatively unskilled in the art. As a further object, I propose as types of structures herein described, structural elements composed of normally flexible materials made rigid by the addition of a binder preferably a binder which may be hardened, such as phenolic condensation products. A still further object is the formation of struts, various plane members and other structural parts of flying machines substantially from laminations, or layers of flexible or plastic material, wrapped, pressed or molded or otherwise formed into structural shapes and impregnated with phenolic condensation products and baked under pressure to afford homogenous structures of great strength and rigidity as well as possessing such properties as insolubility and nonflammability. To these and other ends the invention consists in certain improvements and combinations of parts, all as will be hereinafter more fully described, the novel features being pointed out in the claims at the end of the specification.

Figure 5:
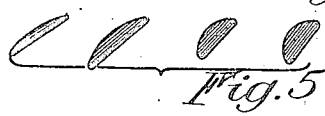
Figure 6:
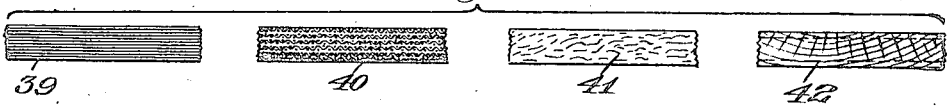

Figure 5 designates a series of sections taken through the blade of the propeller at the points indicated by the lines appearing above the sections;

Figure 6 represents sections of different kinds of material particularly adaptable for use in the construction of flying machines;

Figure 7 is a plan view of the rear end of the body carrying the rudder and elevating planes;

Figure 8 is a sectional view on an enlarged scale taken on line *d—d* of Figure 7;

Figure 9 is a rear elevation of Figure 7 with the rudder and elevating planes removed;

Figure 10 is a detail elevational view of the rudder;

Figure 11 is an enlarged sectional view taken on line *e—e* of Figure 10;

Figure 12 is an enlarged sectional view taken on line *f—f* of Figure 10;

Figure 13 is a detail sectional view on an enlarged scale taken on line *g—g* of Figure 10;

Figure 14 is a view in perspective illustrating the construction of a portion of one of the panels forming the wings or planes of the machine;

Figure 15 is a perspective view showing a modified form of wing construction;

Figure 16 is a sectional view through a wing beam carrying a slightly modified form of spacing member;

Figure 17 is an enlarged detail sectional view illustrating one method of spacing and securing the webs of the wing upon the wing beams;

Figure 18 is a detail sectional view illustrating a slightly different form of wing construction embodying in addition a connection by which the struts are secured to the wings;

Figure 19 is a detail sectional view of another form of wing construction;

Figure 20 is a longitudinal sectional view through one end of a strut;

Figure 21 is a sectional view taken on line *r—r* of Figure 20;

Figure 22 is a sectional view taken on line *s—s* of Figure 20;

Figure 23 is a sectional view similar to Figure 22 showing a cable inclosed and stream-lined;

Figure 24 is a transverse sectional view through a slightly modified form of strut;

Figure 25 is a sectional view through a built-up form of strut;

Figure 26 is a detail sectional view of one of the sections forming a strut shown in Figure 25, and Figure 27 is a transverse sectional view through a modified form of built-up strut.

Similar reference characters throughout the several views indicate the same parts.

Heretofore in the formation of structural elements especially those elements entering into the construction of flying machines, builders have been confined principally to the use of wood and steel. In the present instance, however, it is proposed to employ in the formation of structural elements, filling materials which are normally flexible, laid in laminations, or in layers, and by means of molds, or other devices such materials are formed into structural elements of the kind herein described, through the employment of a suitable binder. It is proposed further to use in conjunction with a suitable filler a binder which may be hardened, rendering the combined mass which has been formed hard and inflexible. I prefer, however, as a binder, the use of a comparatively new and peculiarly adaptable material for this purpose, which is composed of phenolic condensation products. The phenolic condensation products may either be products of phenols and formaldehydes, as described in United States Patents Nos. 942,700, 942,809 and others to Leo H. Baekeland, or condensation products of metracresol and formaldehyde, as listed in other United States patents to the same inventor.

Such a combination results in material possessing properties of lightness, durability and strength, being extremely resistant to chemical agents, as well as for all practical purposes, fire and waterproof.

The material is further adaptable for this purpose on account of its toughness, resistance to wear and other physical properties as well as on account of its being both insoluble and infusible. The reduction in cost of manufacture and time required to turn out the completed structural parts of a machine also renders the use of this material far more advantageous for such purposes than any other known material in existence. It has been found as set forth in the patents above cited, that certain condensation products of phenolic bodies and formaldehyde or their equivalents, which, after being subjected under proper conditions, to the action of heat, become hard, infusible and extremely resistant to chemical agents, as well as to practically all forms of liquids. The filling materials with which said condensation products are compounded are preferably fibrous in character as for example, wood or asbestos fiber or the like. However, paper pulp, sheets of cardboard, or paper, plates of wood, layers of cloth and other like porous bodies may be impregnated with the liquid or dissolved partial-condensation products of phenol and formaldehyde and heat treated until hardened into strong and durable homogeneous bodies. When such materials have been consolidated and hardened as described they may be cut into any desired form.

After this material is once hardened it can not be reset or worked, but while in plastic form it may be pressed or stamped by the use of suitable dies for providing various structural shapes or completed sections and then heat treated while under pressure until hardened into permanent bodies. By stamping and pressing prior to hardening, however, large numbers of parts may be turned out in a relatively short time as compared with the time required to shape, assemble, nail and glue together the numerous wooden members at present employed to construct the supporting planes, propellers, bodies and other structural portions of a flying machine. Not only is a great saving in time, labor and cost of materials effected, but a stronger, more durable and dependable flying machine structure is capable of being produced by the use of the materials described herein than any other materials now in use for this purpose.

Figure 1:
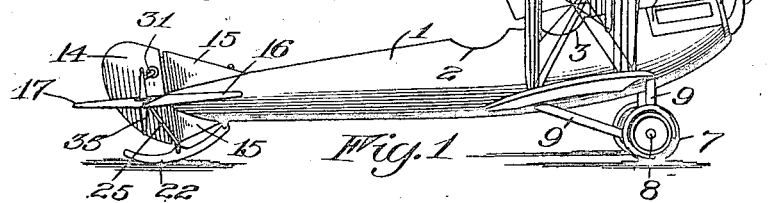
Figure 1 is a side elevation of a flying machine constructed in accordance with the invention.
Figure 2:
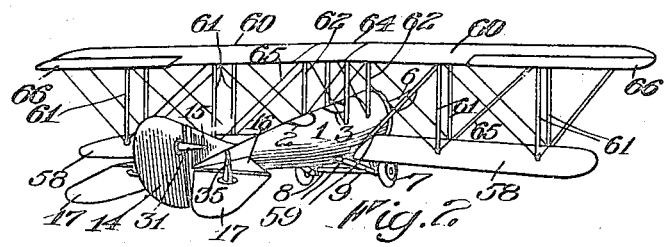
Figure 2 is a view in perspective of the same.

Referring to the drawings by numerals, 1 designates the body of the machine which is preferably in the form of a stream-line boat shaped body constructed in the present instance of one continuous piece as shown in Figures 1 and 2. The body is provided with the openings 2 and 3 in its upper side, at which points the seats in the cock pit are arranged. The front end of the body is provided with a removable cover 4 at the point where the motor is carried. A reinforcing flanged member 5 is provided at the front end of the body in rear of the propeller 6. The running gear comprises the wheels 7 on the axle 8 supported by the braces 9 suitably connected with the underside of the body. At the rear of the body reinforcing projections 10 are adapted to receive the bolts 11 to which are connected the front ends of the guy wires or cables 12 which are connected at their rear ends with the heads of the rudder hinge bolts 13 upon which the rudder 14 is pivotally mounted, said wires or cables serving to brace the rear portion of the body. The extreme rear end of the body is provided with upper and lower vertically positioned stabilizing planes 15 and horizontally extending stabilizing planes 16, both of which are U-shaped in cross section and preferably formed integral with said body portion. This arrangement affords a very rigid construction suitable for supporting the rudder 14 and elevating planes 17 which are pivotally mounted upon hinge bolts 18 carried by a metal cap 19 of U-shaped cross section for covering the rear ends of both the planes 15 and 16.

The stabilizing planes also serve as bracing elements for the rear of the body and to said planes are connected the wires or cables 12 and by the use of the latter the rear body portion is held in compression. The central portion of the metal cap 19 is extended below the bottom stabilizing plane 15 at 20 to pivotally receive at 21 a skid or shock absorber 22, the front end of which is elevated and normally held in juxtaposition to the under surface of the body by an elastic member 23 connected therewith and extending through the lower wall of the rear body portion and secured to the upper wall thereof by a suitable connection 24. Struts or braces 25 are provided for bracing the lower stabilizing plane 15 and the horizontal stabilizing planes 16, the opposite ends of the braces being connected with the planes by suitable connections 26 secured by bolts as shown in Figure 9. The struts 25 are preferably formed of laminations or layers of fibrous or cellular material impregnated with condensation products of phenol and formaldehyde and wound, wrapped or molded into any preferred shape and baked to form a homogeneous body of rigid construction. The construction of the rudder 14 and likewise the elevating planes 17 comprises a front support 27 formed of any suitable material to which is bolted or otherwise secured the blade of the rudder. The support 27 is rounded at its front edge and recessed to receive the front edges of the rearwardly extending and inwardly converging blades or plate sections 28 which are brought together at their rear edges and recessed or offset inwardly to receive the U-shaped section 29, whereby a smooth and continuous trailing edge is provided for the rudder. The inner surfaces of the blade sections 28 are provided with integral and preferably hollow ribs 30 for bracing and strengthening the sections. The sections may be formed in suitable molds or dies by the application thereto of a fiber or other filling material impregnated with certain condensation products of phenol and formaldehyde and heat treated under pressure until the mass is hardened into a solid body of the formation shown. Rudder operating arms 31 having flanges 32 are positioned upon opposite sides of the rudder and secured thereto by the bolts 33 which connect the sections 28 with the support 27. The arms are preferably formed of hollow tapering sections, the outer ends of which carry connections 34 to which the cables for operating the rudder may be attached. The elevating planes 17 are provided with similar arms 35 to which operating cables may be secured. The lower wings or supporting planes 58 of the machine are suitably connected at 59 with the body 1 as shown in Figure 2. The upper wings or supporting planes 60 are connected with the lower wings by suitable struts or posts 61, the detail construction of which will be presently described. The lower ends of the struts or posts 62 are preferably connected with the upper side of the front end of the body, while their opposite ends connect with the inner ends of the wings or supporting surfaces 60 as well as with a central panel 64 positioned between the wings. Suitable guy wires 65 are provided for tying the upper and lower planes together. The ailerons or balancing planes designated at 66 are mounted at the rear of the upper supporting planes 60 as shown in Figures 1 and 2. It will be understood that the upper and lower supporting planes may be formed of as many connected panel sections as desired, the construction of one of said panels being partially indicated in Figure 14. Heretofore in the construction of these panels the webs designated at 67 have usually been constructed of wood built up in three sections strengthened by battens and united by capping strips all of which are nailed and glued together. This highly complex structure requires skilled cabinet makers or joiners and a large percentage of the parts are spoiled while being constructed and assembled and consequently have to be discarded. In overcoming these objections I have provided a one piece web of rigid construction formed of stamped or pressed fiber material saturated with condensation products of phenol and formaldehyde and baked until hardened into a homogeneous body preferably of channel shaped section.

By the use of fiber or other material impregnated with the condensation products of phenol and formaldehyde I am enabled to mold the leading edge 68 and what is known as the veneer strip 69 into a single member, while heretofore it has been necessary in making these parts of wood to form them of two pieces of relatively thin material, thereby weakening the construction and at the same time requiring the utmost skill to prevent the splitting of the nose sections of the webs in the nailing thereon of said veneer strips and leading edge members. This is also true of the nailing on of the top and bottom cap strips which are formed integral with the webs in the present instance. At the rear of the panels I have also simplified the construction and economized in the number of parts and have obviated the employment of skilled cabinet makers by the provision of a one piece trailing edge designated at 70 and preferably U-shaped in cross section. The trailing edge section is provided with an inner transverse strengthening wall 71 against which the rear ends of the webs 67 abut, the upper and lower flanges 72 and 73 of the latter being offset to permit the forwardly projecting flanges of the trailing edge section to extend flush therewith as shown in Figure 14. The webs 67 are provided with openings 74 around which reinforcing walls 75 are provided for strengthening the sections at these points. Suitable guys (not shown) for bracing and tying the panels together are adapted to extend through the openings 74 at various points. The webs 67 are connected by the forwardly and centrally positioned beams 76 and 77 respectively, which are adapted to pass through all of the webs of the several panels forming the wings or supporting planes of the machine. In Figure 14 the beams are tubular in construction, but may be of any other desired form as the I-beam section designated at 78 in Figures 15 and 16.

Suitable spacers for the webs 79 are carried by the beams 78, one form of which is indicated at 80 in Figure 15 and another at 81 in Figure 16. The spacers for the webs 67 which are carried by the tubular beams 76 and 77 are shown in section in Figure 17, one end of which is designated at 82 and the opposite end of a like spacer at 83. The end 82 is threaded externally at 84 to engage and extend through a boss or projection 85 on the web 67, while the end 83 is enlarged at 86 and threaded internally to receive the extreme end of the threaded portion 84. The enlarged portion 86 is adapted to abut the boss 85 on one side of the web, while a collar 87 on the end 82 abuts the opposite side of the web. The tubular beams are passed through the spacers as shown in Figure 17 and are suitably secured upon the end webs of the wings. This arrangement of spacing members affords a very rigid bracing construction for the webs and at the same time, serves to strengthen the beams passing therethrough.

A modified form of spacing construction is shown in Figure 18 in which the boss or projection 88 on the web is threaded externally to receive the internally threaded end 89 of a spacer 90. The opposite end of the spacer 90 is indicated at 91 and is provided with seats 92 for receiving a bracket connection 93 preferably formed of metal and carrying a bent up U-shaped section 94 between the flanges of which, one end of a strut and wing connection 95 is secured, the other end of the connection being threaded into a strut or post 96 for connecting the upper and lower supporting planes. In Figure 19 a modified form of web and spacer construction is shown in which the web comprises a plate like section 97 upon the top and bottom edges of which are positioned strengthening sections 98 having flanges extending upon opposite sides of the plate section and vertical portions engaging the same and cemented or otherwise secured thereon.

The web member 97 is threaded to receive one end 99 of a spacer 100, the portion 99 being threaded both exteriorly and interiorly and in the latter instance for the purpose of receiving the connecting spacer 101. A securing nut 102 is screwed upon the end 99 of the spacer 100 as shown in Figure 19. The tubular wing beams 76 and 77 are passed through the spacers 100 and 101 and secured at their ends in any preferred manner. When the structural portion of a wing or supporting plane is finished a suitable fabric material, designated at 103, is used to cover the entire structure for completing the wing. In Figure 20 I have shown the manner in which the wing connection 95 is secured upon one end of the strut or wing post 96. The connection 95 is provided with a locking extension 104 over which a recessed cap 105 is positioned as clearly shown in Figure 21. The cap is for the purpose of covering the opening 106 and forming with the connection a complete and rounded end for the strut. The strut or wing post is of stream-line construction as indicated in Figure 22 and is formed preferably by winding upon a mandrel or tube layers or laminations of fiber material impregnated with phenolic condensation products. The layers are wound to a suitable depth as indicated at 107 after which a second tube or core of stream-line cross section is placed upon the exterior of the windings, the preferred shape of which is outlined by the opening 106. When this is done the axis of rotation of the mandrel may be changed and additional material is then wound upon the added tube and first windings to form the completed section as shown. The sections are then baked under pressure applied to the surfaces thereof by any suitable means until the material is hardened into a homogeneous body of great strength and rigidity. I have shown in the drawings a method of inclosing and stream-lining exposed aircraft cables. A protective stream-line tubing 108 is shown in Figure 23 in which one or more cables 65 may be inclosed, this tubing to be constructed preferably in accordance with the strut sectional forms described. The life of cable under the conditions imposed in aerial navigation is largely dependent upon the protection afforded. By inclosing, however, and at the same time stream-lining cable the life of such cable may be definitely prolonged, in that the ordinarily excessive vibration is obviated, wind and atmospheric pressures reduced and the cable protected against the disintegrating effects of exposure. The section shown in Figure 24 is constructed in the same manner as the section 96 with the addition of another opening therethrough formed by adding tubes or cores upon opposite sides of the central tube instead of upon one side only. The built-up section 110 illustrated in Figure 25 is formed by placing together the three separate sections, one of which is shown in detail at 111 in Figure 26, and winding thereupon layers of material to form the outer or shell section 112. The sections 113 illustrated in Figure 27 is formed in the same way by the use of two inner sections instead of three, both of which are of the same cross section with their straight sides placed back to back.

Figure 3:
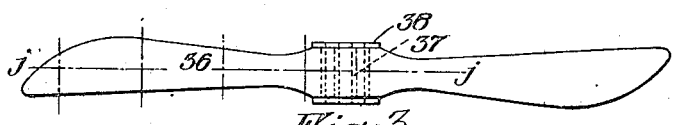
Figure 3 is a side view of an improved propeller.
Figure 4:
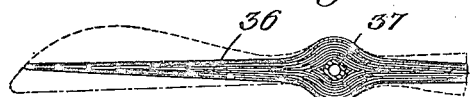
Figure 4 is a sectional view taken on line *j—j* of Figure 3.

Heretofore in the construction of propellers the cost of production has been very considerable owing to the large number of parts, the high price of material required, the necessity of employing expert or skilled workmen and the length of time required for the completion of propellers by the present day methods of construction. In the propeller shown in Figures 3 to 5 inclusive, I have greatly simplified the construction and cheapened the cost of production by the particular manner in which I employ the material above described which is peculiarly adapted for this purpose. The propeller designated at 36 is formed preferably of a series of long and short layers of fabric paper or paper like material, impregnated with a binder which will harden or which may be hardened. In the construction of this propeller, however, I find it preferable to use a binder of phenolic condensation products which may be hardened by baking. The layers of material which have been previously impregnated as above described, are placed one upon another in a suitable two-part mold of proper shape and contour, said layers being laid longitudinally of the propeller in a manner indicated in Figures 4 and 5 with a shaft or axle bearing 37 inserted between the layers at the center of the propeller. It will be understood that as the propeller varies in thickness at different points that the number of layers applied will be greater in thickness at some points thereof than at others, but that nevertheless all the layers may be and preferably are, laid lengthwise of the propeller blades to extend toward the ends thereof upon the opposite sides of the bearing 37 in whatever lengths are required. The bearing 37 is provided with spaced flanges 38 between which said layers are bound. The propeller may also be formed by baking in a mold of an approved shape any suitable filling material in pulp or shredded form impregnated with phenolic condensation products.

In Figure 6 I have shown as designated at 39 and 40 sections of paper and fabric respectively, which are two of the materials particularly adaptable for use in the formation of the structural parts of a flying machine when treated as above described. Also designated at 41 and 42 are sections of fiber and wood respectively saturated with phenolic condensation products, or other binding materials and hardened by baking, preferably under pressure.

It will be understood that all of the parts shown in the drawings which are not specifically described as being formed in the manner set forth or being formed of metal or other materials, are laminated in character, filling materials impregnated with binding materials, preferably said binding materials composed essentially of condensation products of phenol or phenols or metracresol or their equivalents, the whole united by heat or by heat and pressure.

I claim as my invention:

1. A vehicle body consisting essentially of layers of fibrous material impregnated with phenolic condensation products and hardened into a homogeneous mass.

2. A vehicle body composed essentially of layers of paper or paper-like material impregnated with condensation products of phenol and formaldehyde and hardened into a homogeneous mass.

3. A vehicle body consisting essentially of layers of fibrous material impregnated with a binder capable of hardening under heat and pressure and hardened into a homogeneous mass.

4. A tubular stream-lined covering comprising a plurality of superimposed layers of fibrous sheet material impregnated with a phenolic condensation product as a binder.

5. A tubular stream-lined covering comprising fibrous material impregnated with a binder consolidated under heat and pressure.

6. In aircraft construction, a hollow fuselage formed at its rear end with integral, hollow, vertical and horizontal stabilizers and bracing means between the stabilizers and fuselage.

7. In aircraft construction, a hollow fuselage and integral, hollow, horizontal and vertical stabilizers connected with the fuselage, all of these parts being formed of fibrous material impregnated with a phenolic condensation product as a binder, and diagonally extending interiorly located guys connected at one end to the fuselage and at their opposite ends to remote portions of the stabilizers.

8. In aircraft construction, a wing panel including a plurality of spars, ribs mounted in spaced relation upon the spars and provided with integral marginal flanges, leading and trailing edge members connecting the ribs, tubular spacer members enclosing the spars and engaging between adjacent ribs and a wing covering for the panel, all of the parts being formed of layers of fibrous sheet material impregnated with a phenolic condensation product as a binder.

9. In aircraft construction, a wing rib comprising a body formed with lightening openings and integral reenforcing flanges surrounding the openings and the marginal portion of the rib, the rib and its flanges being formed of superimposed layers of fibrous sheet material impregnated with a phenolic condensation product as a binder.

ROBERT KEMP.

Witnesses:
FRANCIS JERDONE, Jr.,
RUSSELL B. GRIFFITH.